Patented Mar. 22, 1949

2,465,045

UNITED STATES PATENT OFFICE 2,465,045

LUTING COMPOSITION

Gunnar Skramstad, Oslo, Norway

No Drawing. Application December 17, 1947, Serial No. 792,333. In Norway July 10, 1946

Section 1, Public Law 690, August 8, 1946

2 Claims. (Cl. 106—119)

The present invention relates to a luting composition that has been found to possess valuable properties for many uses. The composition, which for sake of simplicity may be classified as an agglutinant and/or a lute, consists of a mixture of chalk, casein, alkaline metal oxide or alkaline earth metal oxide, to which mixture has been added a small quantity of cellulose ground to a pulverulent mass. Instead of, or partly instead of chalk may be used lithopone, and hydroxides of alkaline metal or alkaline earth metal may be substituted, wholly or in part, for the oxides of said metals. In some cases it may be found advantageous to incorporate a small quantity of flour, for instance rye flour, but such incorporation is not critical.

The relative quantities used of said materials may vary within rather wide limits. The preferred relations are as follows, given in percentages by weight: Chalk 50–85%, casein 3–8%, slaked lime 5–10%, lithopone 1–15% and cellulose ground to a powder ½–10%.

An especially advantageous composition consists of substantially 80% chalk, 5% casein, 8% slaked lime, 2% lithopone and 3% ground cellulose.

For use the composition is mixed with water and stirred until a uniform paste is formed. This paste is left at rest for a period of about one half hour, whereafter the paste may be applied to bodies that are to be glued together, or the paste may be used for other purposes say for filling up cracks and fissures in masonry, wood and other materials.

The new composition may be used for glueing together objects consisting of glass, porcelain, wood, and other materials. It may be used as a lute for floors and walls, for repairing of masonry, for filling up cracks and fissures.

The composition also may be used as a putty when spattling and painting, further uses are as substratum for linoleum, as floor coverings and the like. The composition hardens or sets and then forms a hard mass that may be ground and polished, whereby its surface becomes perfectly smooth and glaze-like. The product formed is very durable and permanent. Thus it shows no tendency to formation of cracks or fissures, which property, according to tests made, appears to be mostly due to the content of ground cellulose.

In order to obtain a still better resistivity to water of the product finally formed, a small quantity of linseed oil, say 5–10% by weight of the composition, may be added when forming a paste thereof with water.

As a specific example of the composition may serve the following: 800 g. chalk, 50 g. casein, 20 g. rye flour, 80 g. slaked lime, 20 g. lithopone are mixed carefully with 30 g. cellulose that has in beforehand been ground to a pulverulent loose mass.

I claim:

1. A composition of matter comprising a mixture of substantially 50–85% by weight of chalk, 3–8% of casein, 5–10% of slaked lime, 1–15% of lithopone and ½–10% of pulverulent cellulose.

2. A composition of matter consisting of substantially 80% chalk, 5% casein, 2% rye flour, 8% lime, 2% lithopone and 3% ground cellulose fibres.

GUNNAR SKRAMSTAD.

REFERENCES CITED

The following references are of record in the file of this patent:

UNITED STATES PATENTS

| Number | Name | Date |
|---|---|---|
| 1,629,854 | Bates | May 24, 1927 |

FOREIGN PATENTS

| Number | Country | Date |
|---|---|---|
| 112 | Great Britain | 1900 |